United States Patent
Mozaffari et al.

(10) Patent No.: US 12,132,319 B2
(45) Date of Patent: Oct. 29, 2024

(54) PARTIAL-RESONANT CONVERTERS FOR PV APPLICATIONS

(71) Applicant: Enphase Energy, Inc., Petaluma, CA (US)

(72) Inventors: Khalegh Mozaffari, Austin, TX (US); Fernando Rodriguez, Austin, TX (US); Patrick Lyle Chapman, Austin, TX (US)

(73) Assignee: Enphase Energy, Inc., Petaluma, CA (US)

( * ) Notice: Subject to any disclaimer, the term of this patent is extended or adjusted under 35 U.S.C. 154(b) by 234 days.

(21) Appl. No.: 17/690,624

(22) Filed: Mar. 9, 2022

(65) Prior Publication Data

US 2022/0294228 A1    Sep. 15, 2022

Related U.S. Application Data

(60) Provisional application No. 63/159,415, filed on Mar. 10, 2021.

(51) Int. Cl.
  *H02M 7/00* (2006.01)
  *H02J 3/38* (2006.01)
  *H02M 7/48* (2007.01)

(52) U.S. Cl.
  CPC .......... *H02J 3/381* (2013.01); *H02M 7/4807* (2013.01); *H02J 2300/24* (2020.01)

(58) Field of Classification Search
  CPC .............. H02M 7/4807; H02M 5/2932; H02J 2300/24; H02J 3/381
  See application file for complete search history.

(56) References Cited

U.S. PATENT DOCUMENTS

| | | | |
|---|---|---|---|
| 10,998,825 B2* | 5/2021 | Toliyat | H02M 3/33584 |
| 2008/0013351 A1* | 1/2008 | Alexander | H02M 7/4807 363/123 |
| 2008/0049460 A1* | 2/2008 | Mohan | H02M 5/271 363/34 |
| 2013/0057200 A1* | 3/2013 | Potts | H02J 50/12 320/107 |
| 2017/0250618 A1 | 8/2017 | Amirabadi et al. | |
| 2019/0280586 A1 | 9/2019 | Chen et al. | |
| 2020/0106303 A1 | 4/2020 | Thrimawithana et al. | |
| 2021/0273574 A1* | 9/2021 | Zheng | H02M 1/44 |

FOREIGN PATENT DOCUMENTS

| | | |
|---|---|---|
| CN | 107465353 A | 12/2017 |
| JP | 2015177634 A | 10/2015 |

OTHER PUBLICATIONS

International Search Report and Written Opinion for application No., PCT/US2022/019227 dated Jun. 21, 2022, 11 pgs.

* cited by examiner

*Primary Examiner* — Jue Zhang
*Assistant Examiner* — Afework S Demisse
(74) *Attorney, Agent, or Firm* — Moser Taboada

(57) ABSTRACT

A partial-resonant converter is provided herein and comprises a partial resonant link formed by a magnetizing link inductor connected in parallel with a first capacitor on a primary winding side of a transformer and a second capacitor on a secondary winding side of the transformer, a pair of series connected switches coupled across the magnetizing link inductor and the first capacitor, and a plurality of forward conducting bidirectional blocking switches that connect an input source and an output load to the magnetizing link inductor during operation.

20 Claims, 3 Drawing Sheets

PARTIAL-RESONANT CONVERTERS FOR PV APPLICATIONS

CROSS-REFERENCE TO RELATED APPLICATIONS

The present application claims the benefit of and priority to U.S. Provisional Patent Application Ser. No. 63/159,415, filed on Mar. 10, 2021, the entire contents of which is incorporated herein by reference.

BACKGROUND OF THE DISCLOSURE

Field of the Disclosure

Embodiments of the present disclosure relate generally to power conversion, and, in particular, to partial-resonant power converters.

Description of the Related Art

DC-AC power converters play an indispensable role in various electrical power applications, such as converting DC from renewable energy resources to power-grid compliant AC. Topologies for these power converters are designed with various considerations, including cost and efficiency. For example, improving the power density of a converter can contribute to a lower final cost of production.

Therefore, there is a need in the art for improved power converter topologies.

SUMMARY OF THE DISCLOSURE

In accordance with at least some aspects of the disclosure a partial-resonant converter is provided herein and comprises a partial resonant link formed by a magnetizing link inductor connected in parallel with a first capacitor on a primary winding side of a transformer and a second capacitor on a secondary winding side of the transformer, a pair of series connected switches coupled across the magnetizing link inductor and the first capacitor, and a plurality of forward conducting bidirectional blocking switches that connect an input source and an output load to the magnetizing link inductor during operation.

In accordance with at least some aspects of the disclosure a partial-resonant converter is provided herein and comprises a partial resonant link formed by a magnetizing link inductor connected in parallel with a first capacitor on a primary winding side of a transformer and a second capacitor on a secondary winding side of the transformer, a pair of series connected switches coupled across the magnetizing link inductor and the first capacitor, and a plurality of forward conducting bidirectional blocking switches that connect an input source and an output load to the magnetizing link inductor during buck-boost mode of operation.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
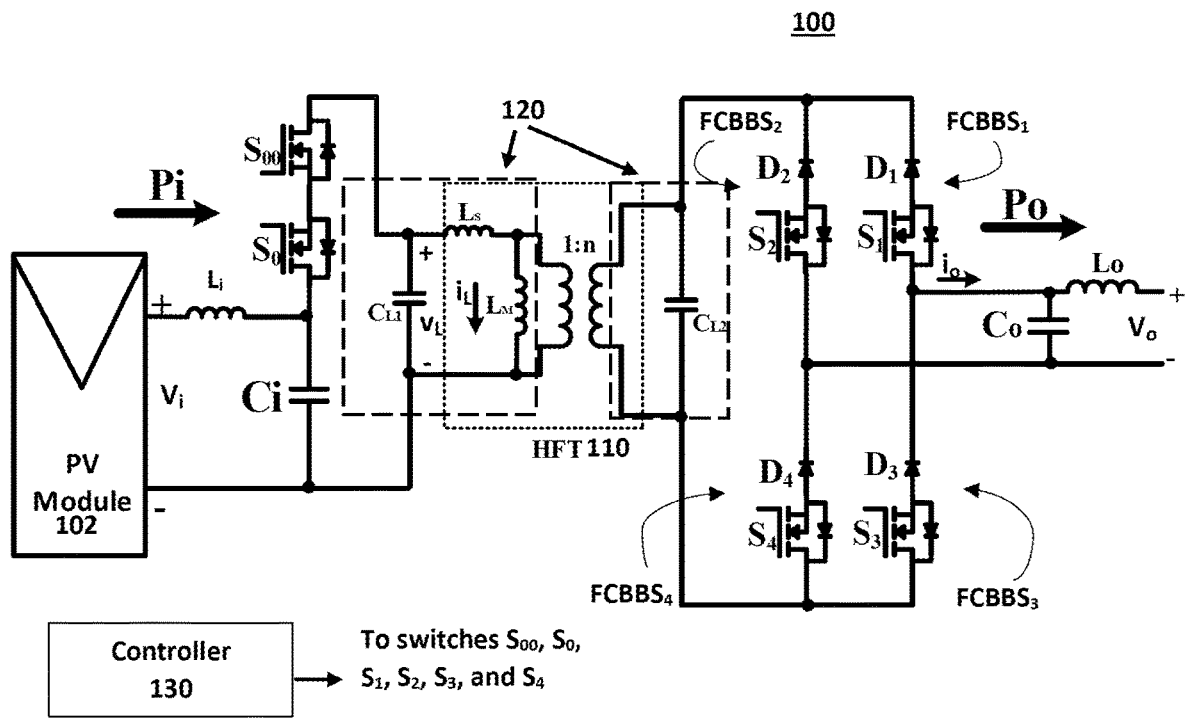
FIG. 1 is a block diagram of a power converter in accordance with one or more embodiments of the present disclosure.

FIG. 1 is a block diagram of a power converter 100 in accordance with one or more embodiments of the present disclosure. This diagram only portrays one variation of the myriad of possible system configurations. The present disclosure can function in a variety of power generation environments and systems.

The power converter 100 is a partial-resonant DC-to-single-phase AC converter with galvanic isolation. The power converter 100 comprises an input switch bridge comprising two back-to-back metal-oxide-semiconductor field-effect transistors, (MOSFETs), (or bidirectional-conducting unidirectional-blocking) $S_{00}$ and $S_0$, (which may in other embodiments be wide-bandgap devices). The $S_0$ drain and a first terminal of an inductor $L_i$ are each coupled to a first terminal of a capacitor $C_i$, a second terminal of the inductor $L_i$ and a second terminal of the capacitor $C_i$ are respectively coupled to positive and negative terminals of a DC input, such as a photovoltaic (PV) module 102. A partial-resonant link 120 is formed by a small magnetizing inductance $L_M$ of a high-frequency transformer (HFT) 110 along with very small AC capacitors $C_{L1}$ and $C_{L2}$ (it is assumed that leakage inductance of the transformer 110—represented in FIG. 1 as $L_S$—is negligible). In some embodiments, $C_{L2}$ may be a reflected capacitance. The magnetizing inductance $L_M$ (and any leakage inductance $L_s$) and the AC capacitor $C_{L1}$ are each coupled across the series combination of the switches $S_{00}$, $S_0$, and the capacitor $C_i$.

The secondary winding of the transformer 110 is coupled across an output bridge which connects the output load to the inductive link. The output bridge comprises four forward-conducting bidirectional-blocking (FCBB) switches. In some embodiments, such as the embodiment depicted in FIG. 1, each FCBB switch may be composed of a series combination of a switch and a diode (switches $S_1$, $S_2$, $S_3$, $S_4$ and corresponding diodes $D_1$, $D_2$, $D_3$, at forming corresponding FCBB switches $FCBBS_1$, $FCBBS_2$, $FCBBS_3$, $FCBBS_4$ in FIG. 1); in other embodiments, a forward-conducting bidirectional-blocking switch may be composed of back-to-back switches (or AC switch), or a switch with bidirectional capability. The switches $FCBBS_2$ and $FCBBS_4$ are coupled to one another in series, and the switches $FCBBS_1$ and $FCBBS_3$ are coupled to one another in series; these series combinations are coupled across the secondary winding of the transformer 110. The transformer 110 has a 1:n turns ratio, and the capacitor $C_{L2}$ is also present across the transformer secondary winding.

A first terminal of an output capacitor $C_O$ is coupled to the drain of the switch $FCBBS_1$ and to a first terminal of an output inductor $L_O$; a second terminal of the output capacitor $C_O$ is coupled to the drain of the switch $FCBBS_2$. Output terminals (i.e., a second terminal of the $L_O$ and the second terminal of the capacitor $C_O$) may be coupled to any suitable system or device, such as a single-phase AC power line. Gate terminals of each of the switches $S_{00}$, $S_0$, and $FCBBS_1$-$FCBBS_4$, are coupled to a controller 130 for operatively controlling the switches.

The power converter 100 functions in buck-boost mode of operation and transfers power entirely through the link inductor, which is charged and discharged each cycle. The power converter 100 has a lower total switch-count than conventional four-quadrant inductive-link converters performing similar functions (e.g., universal power converters). In contrast to these conventional converters that utilize four-quadrant link operation, where the link current can be positive and negative, the power converter 100 restricts the link current to one direction, thereby allowing the power converter 100 to have a smaller number of switches and a simpler control algorithm. Further, the power converter 100 does not utilize any switches around the transformer 110, in contrast to topologies used in a solid-state transformer (SST) applications. The topology of the power converter 100 improves the power density of the converter over conventional topologies such as four-quadrant inductive-link converters and SST converters, and thereby enables a lower final cost of production than for conventional topologies.

In one or more embodiments, the transformer turns ratio 1:n may be 1:9, the inductance $L_S$ may be negligible, and the power converter components may have values on the order of: $C_{L1}$=1 nF, $C_{L2}$=$C_{L1}/n^2$=0.01234 nF (where n=9); $C_o$=1.8 uF, $L_o$=30 uH, $C_i$=13.2 mH, $L_M$=1.8 uH, and $L_S$=2 nH.

Figure 2:
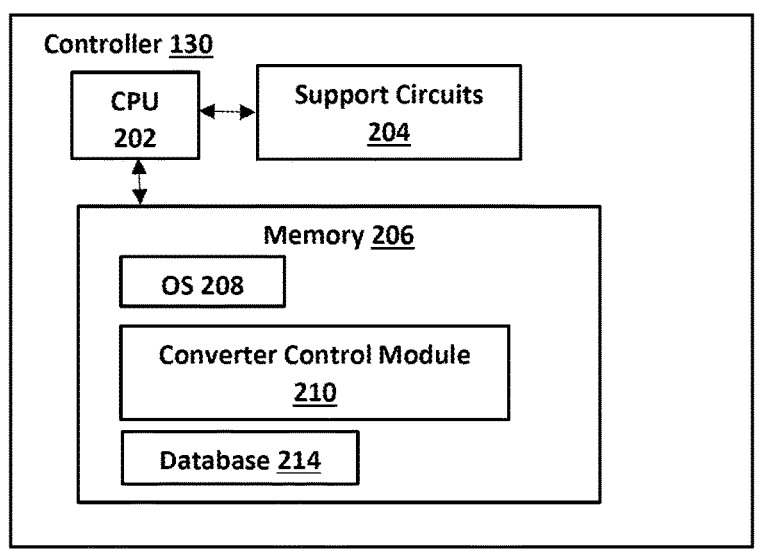
FIG. 2 is a block diagram of a controller in accordance with one or more embodiments of the present disclosure.

FIG. 2 is a block diagram of a controller 130 in accordance with one or more embodiments of the present disclosure. The controller 130 comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). In other embodiments, the CPU 202 may be a microcontroller comprising internal memory for storing controller firmware that, when executed, provides the controller functionality described herein.

The support circuits 204 are well known circuits used to promote functionality of the CPU 202. Such circuits include, but are not limited to, a cache, power supplies, clock circuits, buses, input/output (I/O) circuits, and the like. The controller 130 may be implemented using a general-purpose computer that, when executing particular software, becomes a specific purpose computer for performing various embodiments of the present disclosure.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the controller 130 that can be supported by the CPU capabilities. In some embodiments, the OS 208 may be one of a number of commercially available operating systems such as, but not limited to, LINUX, Real-Time Operating System (RTOS), and the like.

The memory 206 may store various forms of application software, such as a converter control module 210 for controlling operation of the power converter 100 when executed by the controller 130. The memory 206 may further store a maximum power point tracking (MPPT) module 212 that, when executed by the controller 130, determines an operating point for biasing the PV module 102 at its maximum power point (MPP).

The memory 206 may additionally store a database 214 for storing data related to the operation of the power converter 100.

Figure 3:
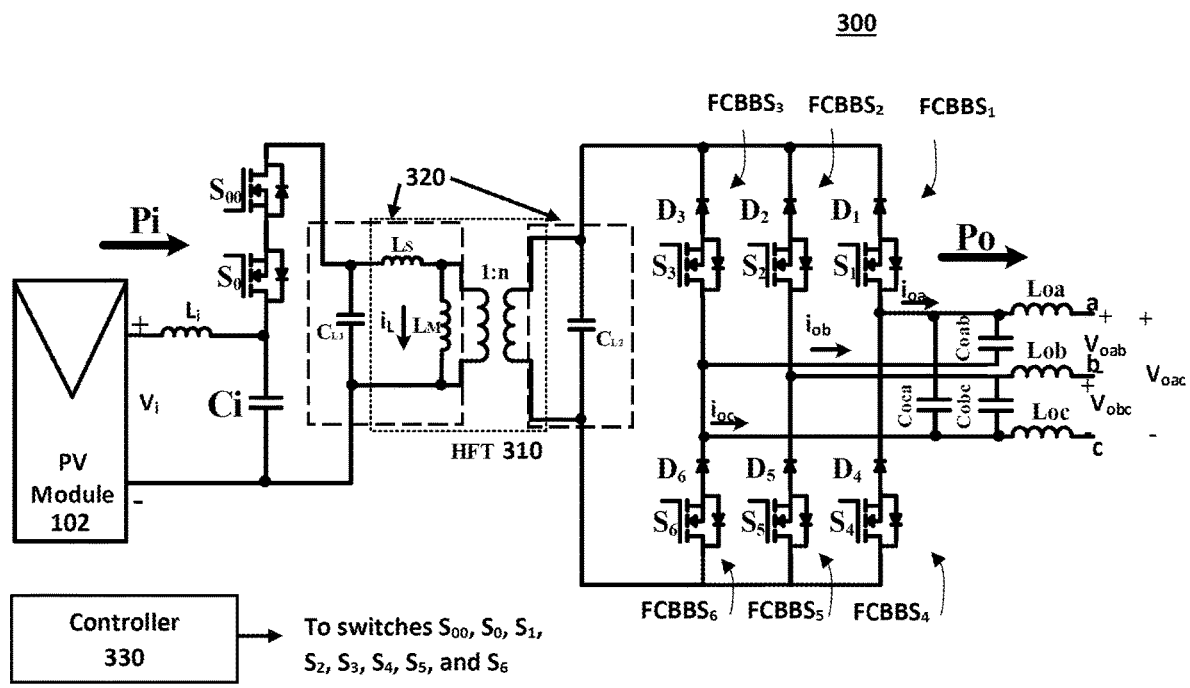
FIG. 3 is a block diagram of a power converter in accordance with one or more embodiments of the present disclosure.

FIG. 3 is a block diagram of a power converter 300 in accordance with one or more embodiments of the present disclosure. This diagram only portrays one variation of the myriad of possible system configurations. The present disclosure can function in a variety of power generation environments and systems.

The power converter 300 is a partial-resonant DC-to-three-phase AC converter with galvanic isolation. Analogous to the power converter 100, the power converter 300 comprises an input switch bridge comprising two back-to-back MOSFETs, (or bidirectional-conducting unidirectional-blocking) $S_{00}$ and $S_0$ (which may in other embodiments be wide band gap devices), where the $S_0$ drain is coupled to a first terminal of an inductor $L_i$ and to a first terminal of a capacitor $C_i$. A second terminal of the inductor $L_i$ and a second terminal of the capacitor $C_i$ are respectively coupled to positive and negative terminals of a DC input, such as the PV module 102. A partial-resonant link 320 is formed by a very small AC capacitors $C_{L1}$ and $C_{L2}$ (which in some embodiments may be a reflected capacitance) along with a small magnetizing inductance $L_M$ of a HFT 310 (it is assumed that leakage inductance of the transformer 310—represented in FIG. 3 as $L_S$—is negligible). The capacitor $C_{L1}$ is further coupled across the series combination of the switches $S_{00}$, $S_0$ and the capacitor $C_i$.

The secondary winding of the transformer 310 is coupled across an output bridge that connects the output load to the inductive link. The output bridge comprises six forward-conducting bi-directional-blocking (FCBB) output switches $FCBBS_1$-$FCBBS_6$ In some embodiments, such as the embodiment depicted in FIG. 3, each forward-conducting bidirectional-blocking switch may be composed of a series combination of a switch and a diode (switches $S_1$, $S_2$, $S_3$, $S_4$, $S_5$, $S_6$ and corresponding diodes $D_1$, $D_2$, $D_3$, $D_4$, $D_5$, $D_6$ forming corresponding forward-conducting bi-directional-blocking switches $FCBBS_1$, $FCBBS_2$, $FCBBS_3$, $FCBBS_4$, $FCBBS_5$, $FCBBS_6$ in FIG. 3); in other embodiments, a forward-conducting bidirectional-blocking switch may be composed of back-to-back switches (or AC switch), or a switch with bidirectional capability. The switches $FCBBS_1$ and $FCBBS_4$ are coupled to one another in series, the switches $FCBBS_2$ and $FCBBS_5$ are coupled to one another in series, and the switches $FCBBS_3$ and $FCBBS_6$ are coupled to one another in series; these series combinations are each coupled across the secondary winding of the transformer 310. The transformer 310 has a 1:n turns ratio, and the capacitor $C_{L2}$ is also present across the transformer secondary winding.

An output capacitor $C_{oca}$ is coupled between the drain terminals of the switches $FCBBS_1$ and $FCBBS_3$; to a first terminal of an output inductor $L_{oa}$; an output capacitor $C_{obc}$ is coupled between the drain terminals of the switches $FCBBS_2$ and $FCBBS_3$; and an output capacitor $C_{oab}$ is coupled between the drain terminals of the switches $FCBBS_1$ and $FCBBS_2$. The output inductor $L_{oa}$ is coupled between the drain terminal of the switch $FCBBS_1$ and a first output terminal a; an output inductor $L_{ob}$ is coupled between the drain terminal of the switch $FCBBS_2$ and a second output terminal b; and an output inductor $L_{oc}$ is coupled between the drain terminal of the switch $FCBBS_3$ and a third output terminal c. The output terminals a, b, and c may be coupled to any suitable system or device, such as a three-phase AC power line. Gate terminals of each of the switches $S_{00}$, $S_0$, and $FCBBS_1$-$FCBBS_6$, are coupled to a controller 330 for operatively controlling the switches.

The power converter 300 functions in buck-boost mode of operation and transfers power entirely through the link inductor, which is charged and discharged each cycle. The power converter 300 has a lower total switch-count than conventional four-quadrant inductive-link converters performing similar functions (e.g., universal power converters). In contrast to these conventional converters that utilize four-quadrant link operation, where the link current can be positive and negative, the power converter 300 restricts the link current to one direction, thereby allowing the power converter 300 to have a smaller number of switches and a simpler control algorithm. Further, the power converter 300 does not utilize any switches around the transformer 310, in contrast to topologies used in SST applications. Further in contrast to conventional topologies, the topology of the power converter 300 removes the need for an electrolytic capacitor, employs a simpler application control with only one processor; can be installed in increments of one; eliminates the high cost associated with double frequency ripple as power increases; and enables flexibility in developing multi-input/multi-output products such as three-phase water pump or three-phase motor drive applications. The topology of the power converter 300 improves the power density of the converter over conventional topologies, such as universal power converters and SST converters, and thereby enables a lower final cost of production than for conventional topologies.

In one or more embodiments, the transformer turns ratio 1:n may be 1:9, the inductance $L_S$ may be negligible, and the power converter components may have values on the order of: $C_{L1}$=2 nF, $C_{L2}$=Cu/n²=0.125 nF (where n=9); $L_i$=33 uH, $C_i$=50 uF, $L_M$=3.2 uH, $L_s$=2 nH, $C_{oa}$=2 uF, $C_{ob}$=2 uF, $C_{oc}$=2 uF, $L_{oa}$=100 uH, $L_{ob}$=100 uH, $L_{oc}$=100 uH.

Figure 4:
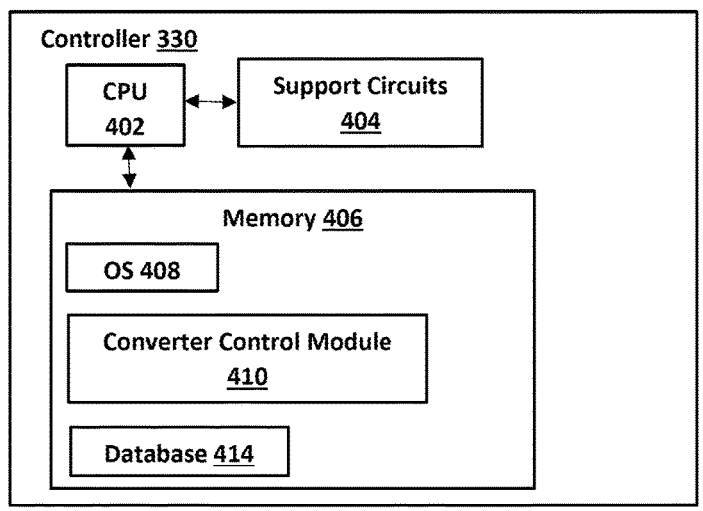
FIG. 4 is a block diagram of a controller in accordance with one or more embodiments of the present disclosure.

FIG. 4 is a block diagram of a controller 330 in accordance with one or more embodiments of the present disclosure. Analogous to the controller 130, the controller 330 comprises support circuits 304 and a memory 306 each coupled to a CPU 302, the memory 306 storing various forms of application software such as a converter control module 410 for controlling operation of the power converter 300 when executed by the controller 330.

Figure 5:
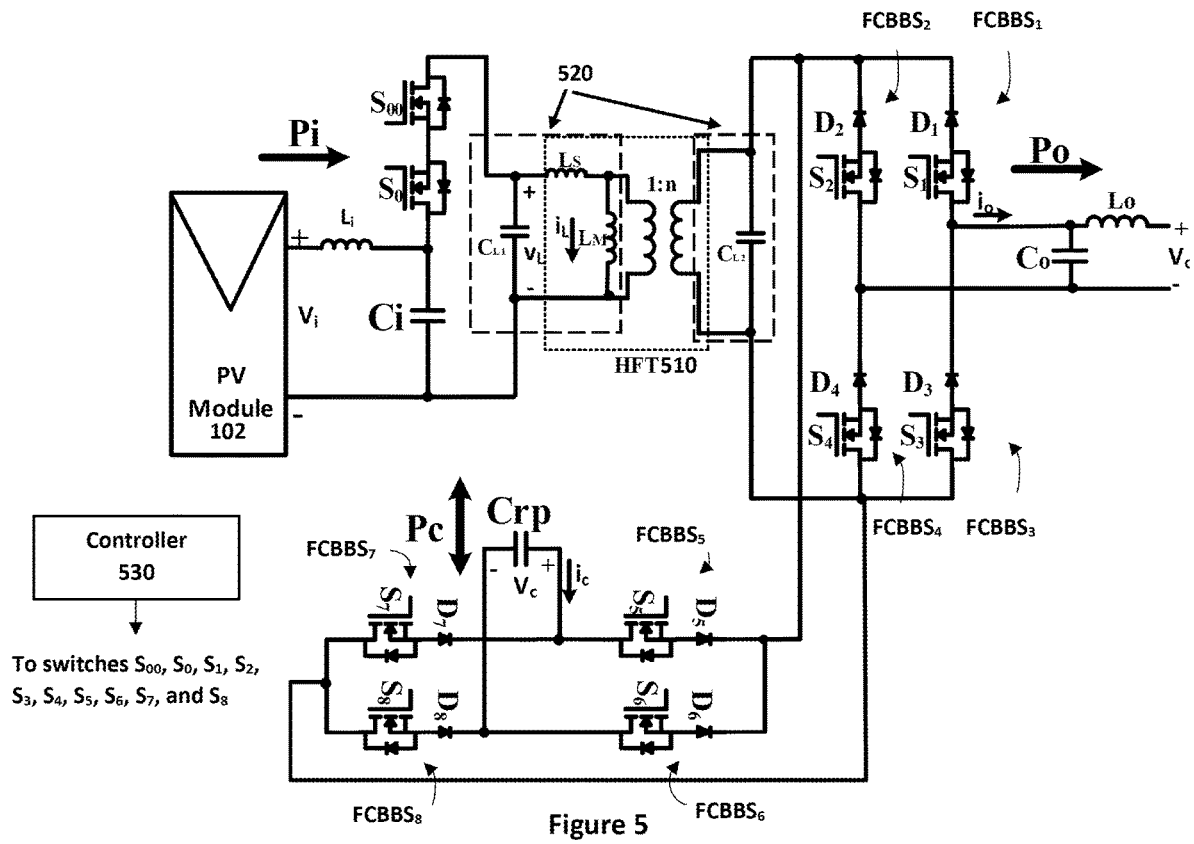
FIG. 5 is a block diagram of a power converter in accordance with one or more embodiments of the present disclosure.

FIG. 5 is a block diagram of a power converter 500 in accordance with one or more embodiments of the present disclosure. This diagram only portrays one variation of the myriad of possible system configurations. The present disclosure can function in a variety of power generation environments and systems.

The power converter 500 is a partial-resonant DC-to-single-phase AC converter with galvanic isolation and suppressed double-frequency ripple. The power converter 500 comprises the topology of the power converter 100 along with an extra bridge—called a ripple bridge—coupled across the output bridge of forward-conducting bi-directional-blocking switches $FCBBS_1$-$FCBBS_4$ to handle double-frequency ripple. The ripple bridge comprises forward-conducting bidirectional-blocking switches $FCBBS_5$-$FCBBS_8$ (switches $S_5$, $S_6$, $S_7$, $S_8$ and corresponding diodes $D_5$, $D_6$, $D_7$, DB forming corresponding forward-conducting bi-directional-blocking switches $FCBBS_5$, $FCBBS_6$, $FCBBS_7$, $FCBBS_8$ in FIG. 5) coupled in a bridge configuration, with a small capacitor $C_{rp}$ coupled between the midpoints of each bridge leg.

As with the power converters 100 and 300, the power converter 500 functions only in buck-boost mode of operation and transfers power entirely through the link inductor, which is charged and discharged each cycle, and has a lower switch-count than four-quadrant inductive-link conventional converters performing similar functions. Further in contrast to conventional single-phase DC-AC topologies without suppressing the double frequency ripple, the topology of the power converter 500 removes the need for a bulky electrolytic capacitor, eliminates the high cost associated with double frequency ripple as power increases; and enables flexibility in developing multi-input/multi-output products.

In one or more embodiments, the transformer turns ratio 1:n may be 1:9, the inductance $L_S$ may be negligible, and the power converter components may have values on the order of: $C_{L1}$=1 nF, $C_{L2}$=$C_{L1}$/n²=0.01234 nF (where n=9); $C_o$=1.8 uF, $L_o$=30 uH, $L_i$=100 uH, $C_i$=24 uF, $C_{rp}$=10 uF, $L_M$=1.8 uH, Ls=2 nH.

Figure 6:
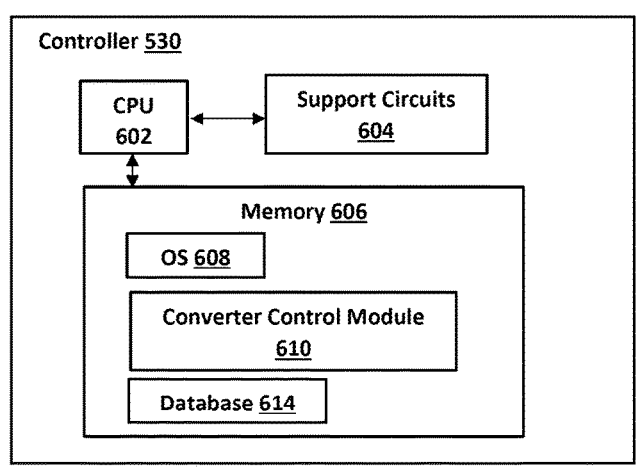
FIG. 6 is a block diagram of a controller in accordance with one or more embodiments of the present disclosure.

FIG. 6 is a block diagram of a controller 530 in accordance with one or more embodiments of the present disclosure. Analogous to the controllers 130 and 330, the controller 530 comprises support circuits 604 and a memory 606 each coupled to a CPU 602. The memory 606 stores various forms of application software such as a converter control module 610 for controlling operation of the power converter 500 when executed by the controller 530.

While the foregoing is directed to embodiments of the present disclosure, other and further embodiments of the disclosure may be devised without departing from the basic scope thereof.

What is claimed is:

1. A partial-resonant converter, comprising:
   a partial resonant link formed by a magnetizing link inductor connected in parallel with a first capacitor on a primary winding side of a transformer and a second capacitor on a secondary winding side of the transformer;
   a four-quadrant switch comprising a pair of series connected bidirectional-conducting unidirectional-blocking switches coupled across the magnetizing link inductor and the first capacitor,
   wherein an input filter of the partial-resonant converter comprises an input inductor and an input capacitor, and
   wherein a drain of one of the pair of series connected bidirectional-conducting unidirectional-blocking switches and a first terminal of the input inductor are each coupled to a first terminal of input capacitor and a second terminal of the input inductor and a second terminal of the input capacitor are respectively coupled to positive and negative terminals of a DC input of the partial-resonant converter, such that the magnetizing link inductance and the first capacitor are each coupled across the series connected bidirectional-conducting unidirectional-blocking switches and the input capacitor; and
   a plurality of forward conducting bidirectional blocking switches that connect an input source and an output load to the magnetizing link inductor during operation.

2. The partial-resonant converter of claim 1, wherein the transformer is a high-frequency transformer.

3. The partial-resonant converter of claim 1, wherein magnetizing link inductor is charged and discharged in each cycle of a buck-boost mode of operation.

4. The partial-resonant converter of claim 1, wherein the magnetizing link inductor has an inductance of 1.8 pH, the first capacitor has a capacitance of about 1 nF, wherein the second capacitor has a capacitance of about 0.01234 nF and is equal to $C_{L2}=C_{L1}/n^2$ (where n=9).

5. The partial-resonant converter of claim 1, wherein the plurality of forward conducting bidirectional blocking switches comprise one of:
  a series combination of a switch and a diode comprising four switches and four corresponding diodes; or
  a series combination of a switch and a diode comprising six switches and six corresponding diodes.

6. The partial-resonant converter of claim 5, wherein when the plurality of forward conducting bidirectional blocking switches comprise four switches and four corresponding diodes:
  a first terminal of an output capacitor is coupled to a drain terminal of a first switch and to a first terminal of an output inductor;
  a second terminal of the output capacitor is coupled to a drain terminal of a second switch;
  a second terminal of the output inductor and a second terminal of the output capacitor are each coupled to a single-phase AC power line; and
  gate terminals of the pair of series connected bidirectional-conducting unidirectional-blocking switches and the four switches are coupled to a controller for operative control thereof.

7. The partial-resonant converter of claim 6, wherein the output capacitor has a capacitance of about 1.8 μF.

8. The partial-resonant converter of claim 6, further comprising a ripple bridge coupled across the four switches and configured to manage double-frequency ripple.

9. The partial-resonant converter of claim 8, wherein the ripple bridge comprises four switches and four corresponding diodes coupled in a bridge configuration, and wherein a capacitor having a capacitance of about 10 μF is coupled between midpoints of each bridge leg.

10. The partial-resonant converter of claim 5, wherein when the plurality of forward conducting bidirectional blocking switches comprise six switches and six corresponding diodes:
  a first output capacitor is coupled between a drain terminal of a first switch and a drain terminal of a third switch and to a first terminal of an output inductor;
  a second output capacitor is coupled between a drain terminal of a second switch and the drain terminal of the third switch;
  a third output capacitor is coupled between the drain terminal of the first switch and the drain terminal of the second switch;
  a first output inductor is coupled between the drain terminal of the first switch and a first output terminal;
  a second output inductor is coupled between the drain terminal of the second switch and a second output terminal;
  a third output inductor is coupled between the drain terminal of the third switch and a third output terminal;
  the first, second, and third output terminals are coupled to a three-phase AC power line; and
  gate terminals of each of the pair of series connected bidirectional-conducting unidirectional-blocking switches and the six switches are coupled to a controller for operative control thereof.

11. The partial-resonant converter of claim 10, wherein the first output capacitor, the second output capacitor, and the third output capacitor each have a capacitance of about 1.8 μF.

12. The partial-resonant converter of claim 1, wherein the input source is a photovoltaic module and the output load is one of a single-phase AC power line or a three-phase AC power line.

13. A partial-resonant converter, comprising:
  a partial resonant link formed by a magnetizing link inductor connected in parallel with a first capacitor on a primary winding side of a transformer and a second capacitor on a secondary winding side of the transformer;
  a four-quadrant switch comprising a pair of series connected bidirectional-conducting unidirectional-blocking switches coupled across the magnetizing link inductor and the first capacitor,
  wherein an input filter of the partial-resonant converter comprises an input inductor and an input capacitor, and
  wherein a drain of one of the pair of series connected bidirectional-conducting unidirectional-blocking switches and a first terminal of the input inductor are each coupled to a first terminal of input capacitor and a second terminal of the input inductor and a second terminal of the input capacitor are respectively coupled to positive and negative terminals of a DC input of the partial-resonant converter, such that the magnetizing link inductance and the first capacitor are each coupled across the series connected bidirectional-conducting unidirectional-blocking switches and the input capacitor; and
  a plurality of forward conducting bidirectional blocking switches that connect an input source and an output load to the magnetizing link inductor only during buck-boost mode of operation.

14. The partial-resonant converter of claim 13, wherein the transformer is a high-frequency transformer.

15. The partial-resonant converter of claim 13, wherein the magnetizing link inductor has an inductance of 1.8 μH, the first capacitor has a capacitance of about 1 nF wherein the second capacitor has a capacitance of about 0.01234 nF and is equal to $C_{L2}=C_{L1}/n^2$ (where n=9).

16. The partial-resonant converter of claim 13, wherein the plurality of forward conducting bidirectional blocking switches comprise one of:
  a series combination of a switch and a diode comprising four switches and four corresponding diodes; or
  a series combination of a switch and a diode comprising six switches and six corresponding diodes.

17. The partial-resonant converter of claim 16, wherein when the plurality of forward conducting bidirectional blocking switches comprise four switches and four corresponding diodes:
  a first terminal of an output capacitor is coupled to a drain terminal of a first switch and to a first terminal of an output inductor;
  a second terminal of the output capacitor is coupled to a drain terminal of a second switch;
  a second terminal of the output inductor and a second terminal of the output capacitor are each coupled to a single-phase AC power line; and
  gate terminals of the pair of series connected bidirectional-conducting unidirectional-blocking switches and the four switches are coupled to a controller for operative control thereof.

18. The partial-resonant converter of claim 17, wherein the output capacitor has a capacitance of about 1.8 μF.

19. The partial-resonant converter of claim 17, further comprising a ripple bridge coupled across the four switches and configured to manage double-frequency ripple.

20. The partial-resonant converter of claim 19, wherein the ripple bridge comprises four switches and four corresponding diodes coupled in a bridge configuration, and wherein a capacitor having a capacitance of about 10 μF is coupled between midpoints of each bridge leg.

* * * * *